Figure 1:
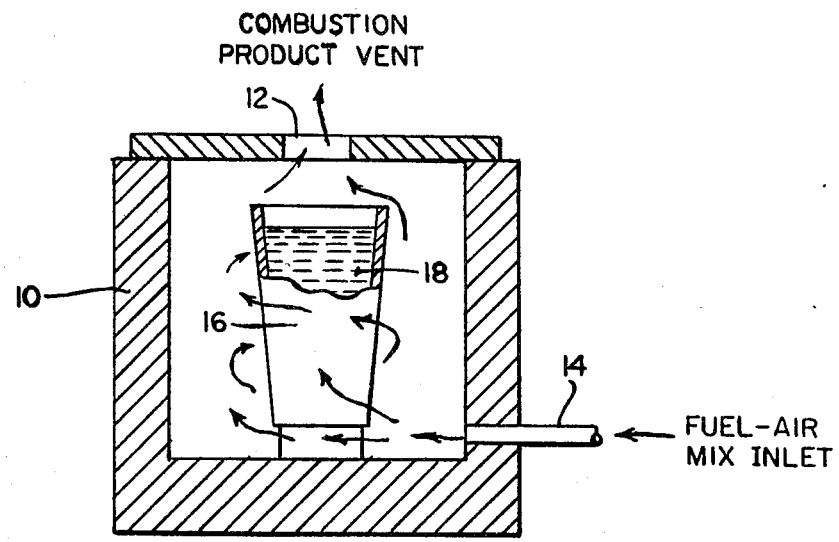

United States Patent [19]
Miller

[11] 3,971,712
[45] July 27, 1976

[54] PROCESS FOR REMOVING SULFUR IMPURITIES FROM A FLUID BY CONTACT WITH SILVER ARTICLES

[75] Inventor: Jaydee W. Miller, Wallingford, Pa.

[73] Assignee: Pyromet, Inc., Wallingford, Pa.

[22] Filed: Nov. 29, 1973

[21] Appl. No.: 420,224

Related U.S. Application Data

[63] Continuation-in-part of Ser. Nos. 4,335, Jan. 20, 1970, abandoned, and Ser. No. 93,750, Nov. 30, 1970, abandoned, and Ser. No. 282,029, Aug. 1, 1972, Pat. No. 3,892,562.

[52] U.S. Cl. ............................. 208/208 R; 423/244
[51] Int. Cl.² ........................................ C10G 23/02
[58] Field of Search ............... 208/208 R, 209, 213; 252/477 Q; 423/244

[56] References Cited
UNITED STATES PATENTS
1,741,834   12/1929   Fischer ............................... 423/244

FOREIGN PATENTS OR APPLICATIONS
29,429       10/1930   Australia ............................. 208/213
1,173,838   11/1967   United Kingdom ............. 252/477 Q Primary Examiner—M. J. Andrews
Attorney, Agent, or Firm—Barry A. Bisson

[57] ABSTRACT

A process for removing sulfur impurities from a fluid, such as flue gas or a petroleum fraction, comprises contacting the fluid with a solid, porous silver article under conversion conditions which cause said sulfur impurity to be removed from said fluid by said silver article.

10 Claims, 2 Drawing Figures

U.S. Patent    July 27, 1976    3,971,712

INVENTOR
JAYDEE W. MILLER
ATTORNEY

PROCESS FOR REMOVING SULFUR IMPURITIES FROM A FLUID BY CONTACT WITH SILVER ARTICLES

CROSS REFERENCES TO RELATED APPLICATIONS

This is a continuation-in-part of my application Ser. No. 4,335 filed Jan. 20, 1970, titled "Process for Producing High Purity Silver" (now abandoned) and of my application Ser. No. 93,750 filed Nov. 30, 1970 entitled "Process for Producing High Purity Silver Articles of Manufacture" now abandoned and of my application Ser. No. 282,029 filed Aug. 1, 1972 entitled "Process of Producing High Purity Silver" now U.S. Pat. No. 3,892,562.

BACKGROUND

Porous silver containing chemically combined sulfur (e.g., as silver sulfate, silver sulfide, etc.) is useful as a catalyst (as for hydrodesulfurization of petroleum oils) or as an electrode in a battery utilizing a sulfur system (e.g., sulfur-lithium).

Known prior art processes for producing high porosity silver articles containing chemically combined sulfur are generally expensive and inefficient, since they require a high purity (e.g., 99.9%) porous silver as a starting material. Prior art methods for producing porous silver articles are shown for example in U.S. Pat. No. 3,052,967 to Fischer.

It is therefore one general object of the present invention to provide a method of producing an article of porous silver containing chemically combined sulfur and which is less expensive and more efficient (e.g., less manual handling) than processes used for this purpose to date.

It is a more specific object of this invention to provide a process for producing a porous silver containing chemically combined sulfur in conjunction with a process for recovering silver, in ultra pure form (e.g., 99.9%) from silver sulfide, mixtures of silver with sulfur, or silver sulfide with zinc. Such a mixture occurs as the precipitate in spent photographic hypo solutions when zinc powder is added to precipitate silver.

SUMMARY OF THE INVENTION

I have discovered as a novel article or composition, porous silver containing chemically combined sulfur (e.g., silver sulfide, silver sulphate) which has a different microstructure from prior art porous silver. The nature of the novel structure can best be described by reference to the accompanying photographs which are representative of the microstructure at 100X and 1000X.

A process for preparation of this novel composition is described in my previously cited applications Ser. No. 4,335; 93,750 and 282,029; however, it was not appreciated in those applications that the porous articles described therein were not silver of 99.9% purity but contained chemically combined sulfur in amounts sufficient to enable the porous article to be useful as a battery electrode in a silver-sulfur or similar system or to enable the porous article to be useful as a catalyst or reagent for desulfurization of gases (e.g., stack gas) and liquids, especially hydrodesulfurization of petroleum fractions (e.g., gasoline, kerosene, lube oils, etc.).

In general, the novel porous silver containing chemically combined sulfur can be obtained by condensation of molten droplets which are expelled from an oxygenated melt of impure silver of about 99.5 to about 99.8% purity wherein the impurity consists essentially of sulfur (e.g., sulfur present as silver sulfide). When oxygen is passed over and/or through such a melt (or a silver melt containing a greater amount of sulfur), a considerable quantity of oxygen appears to dissolve in the melt and, at about 0.5% sulfur and 99.5% silver such a melt will "boil" violently (apparently due to a chemical reaction of the oxygen with the sulfur compounds in the melt). When no flux or similar reagent is present in the melt, the violent boiling action of this chemical reaction with oxygen causes minute droplets of silver to be expelled from the melt. These droplets can be condensed (as in a cross-stream of cold air) to form beads or a fine powder or they can be collected on a condensing surface (as a flat cover member), in which case if the build-up is permitted to continue a porous silver article will be obtained. Due to the presence of sulfur dioxide (and, perhaps, some sulfur trioxide) in the gases evolving from the melt and/or melt surfaces, the porous silver article will contain some chemically combined sulfur. This sulfur can be removed from the article by further processing (as by contact with hot hydrogen as at about 500°F or with oxygen at about 300°F); however, for many uses (as for a battery electrode in contact with sulfur or a sulfur compound), the chemically combined sulfur is desirable, in fact in some cases it is desirable to combine additional sulfur with the porous article, as by contacting the article with a sulfur oxide and oxygen or with molten sulfur or $H_2S$ (e.g., at 60° to 120°F). Accordingly, the teachings herein can permit production of 99.9+% pure porous silver articles or of porous silver articles containing chemically combined sulfur (typically, articles can be made which analyze in the range of about 0.1 to 8 weight percent sulfur (more typical 0.5 to 5%, e.g., about 2%).

BRIEF DESCRIPTION OF THE INVENTION

These and other objects can be met by a two stage process, the first stage of which comprises producing a melt of about 99.5% silver and 0.5% sulfur. Preferably this first stage consists essentially of heating to 950° to 1000°C, in the presence of excess oxygen, a silver containing mixture, which includes as impurities zinc and sulfur. The sulfur may be present as silver sulfide. The mixture is held at this temperature for a sufficient length of time to permit the zinc to vaporize and oxidize and most of the sulfur to oxidize. These impurities therefore escape as gaseous products. In the second stage of this process the molten mixture of about 99.5% silver 0.5% sulfur is further purified by bubbling oxygen through the melt. The oxygen dissolves in the melt and reacts with the residual sulfur, present as dissolved silver sulfide, in the molten metal to produce sulfur dioxide and pure silver. This stage of the process is characterized by a violent boiling action at the surface of the molten silver due to escaping sulfur dioxide. The violent boiling action does not occur if the purity of the silver is much below 99.5% and ceases when substantially all the residual sulfur has been removed from the molten metal, at which time the silver product has a purity above 99.9%.

The starting material for the preferred first stage of this process can contain in the range of 0 to 35% water (preferably it is dried to 0 to 10% water) and may comprise (on a bone-dry basis), for example, an 80% silver, 5% sulfur, and 5% zinc mixture which is readily available as a precipitate from spent photographic hypo solutions treated with zinc powder to precipitate silver metal. Small amounts (up to 10%) of oxygen, sodium and organic material can also be present in the precipitate. Another starting material is about 95% silver, 5% sulfur and can be obtained by electrolysis of photographic hypo solutions.

This preferred first stage is carried out in a closed furnace with a vent for the escape of water vapor and gaseous combustion products. A fuel, such as propane or natural gas, is admitted to the furnace with sufficient air to provide an amount of oxygen about 15% in excess of that necessary for complete oxidation of the fuel. The silver mixture is contained in a boat in the furnace about which fuel, air, and gaseous combustion products are free to circulate. During the second stage of the process, a condensing surface, such as a substantially flat member, is preferably disposed at a suitable distance about the violently boiling molten silver as oxygen is passed over and/or through the molten silver so that metallic silver ejected from the melt by the boiling action is solidified on the underside of the flat member. Although this solid silver condensate may be remelted and reintroduced into the silver melt, this solidified metallic silver typically is highly porous and contains chemically combined sulfur and can be recovered and utilized as a catalyst, electrode for batteries, etc. The porous articles can have, for example, about 35 volume percent void space and analyze in the range of 0.1 to 8 weight percent sulfur (typically 0.5 to 5%, e.g., about 2%).

If, instead of a flat member to cover the boat, an inverted crucible is used, a fine silver powder will collect on the cold regions. This powder consists essentially of small spheres. This silver powder can be utilized in electrically conductive paints. The condensing surface can be of any desired geometrical configuration (e.g., flat, conical, hemispherical, concave, convex); however, a substantially flat member is usually preferred since curved members tend to cause concommittant powder formation due to the temperature gradient. Also, it is easier to remove the condensed (or cooled) porous article from a substantially flat condensing surface. The surface can be of any suitable material which will not melt and which is preferably resistant to oxidation, such as silicon carbide. Sheet graphite is also suitable, although it is subject to oxidation, since it has a sufficiently slow oxidation rate to permit a reasonably long period of use before replacement is necessary.

The microstructure of the novel porous silver can be described as somewhat similar in configuration to the interconnecting cage structure found in the crystalline aluminosilicate zeolites which are commonly referred to as molecular sieves; however, the dimensions of the cages are much longer than the 3 to 15 angstrom unit mean diameters found in the zeolites.

As can be seen in the accompanying photographs, the cage-type structure is made up of condensed globules or agglomerated droplets of slightly different sizes; however, the range of sizes of the agglomerates is not very great (e.g., most agglomerates appear to contain no more than about ten droplets). This structure of irregular pathways and interconnecting cages composed of condensed droplets and relatively small, uniform agglomerates is to be contrasted with the type of channelled, "fused-bead" structure which is produced by the process of U.S. 3,052,967 to Fischer.

The porous silver articles (or sponges) produced by my process are different from prior art porous silver articles of U.S. Pat. No. 3,052,967 to Fischer in that articles of the Fischer process must contain channels, formed by the escaping decomposition products of the resinous beads (which are decomposed in order to produce void spaces between the metal particles). Also in the Fischer process local hot-spots can occur within the article during the decomposition, thus causing local melting, bubbling and undesirable structural irregularities.

FURTHER DESCRIPTION OF THE INVENTION

Figure 2:
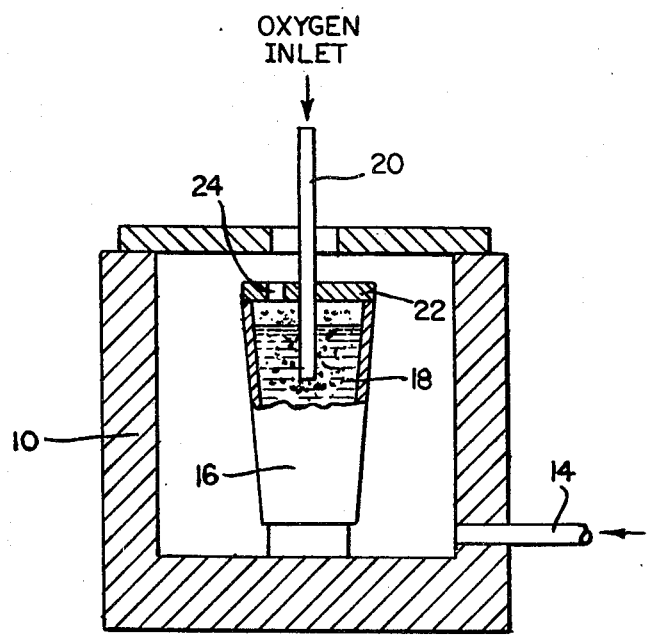

This invention, which is specifically set forth in the claims appended hereto, may be better understood from the following detailed description taken in conjunction with the accompanying drawings in which FIG. 1 is a cross-sectional view of the furnace and boat used therein during an initial purification stage of one embodiment of the process of the present invention; and FIG. 2 is a similar cross-section of the furnace during the final purification and/or article-forming stage of the process of the present invention.

Referring more specifically to FIG. 1, there is shown, in cross-section, a furnace enclosure 10 having a vent 12 for gaseous combustion products and an inlet 14 for fuel, generally a gaseous fuel such as propane or natural gas, and air or oxygen. In another embodiment (not shown) heat can be furnished (in whole or in part) by other means as by an induction furnace. A boat is disposed in furnace enclosure 10 such that air, fuel, and gaseous combustion products may circulate thereabout. A powdered mixture including silver, sulfur, and zinc is charged to the furnace in boat 16 and additional quantities of this mixture are added to the boat as the previously added portions melt so that finally the boat is substantially filled with a molten mixture 18 of the silver containing material.

During this initial purification stage of the process fuel and air are introduced into the furnace enclosure and are burned therein so as to heat the contents of the furnace, more specifically the silver containing material 18 and boat 16, to a temperature above the melting point of silver, generally 950° to 1200°C but preferably 1100° to 1200°C. An excess of air is deliberately added over that needed to react completely with the fuel so that there is an excess of oxygen in the atmosphere surrounding the molten silver containing material which tends to oxidize most of the sulfur, zinc and other impurities in the material. Generally, the pressure in furnace enclosure 10 is about atmospheric. The zinc in the silver containing material vaporizes from the mixture and escapes from furnace enclosure 10, either in metallic or oxidized form, with gaseous combustion products and any unused gas from the fuel-air mixture through combustion product vent 12. The oxidation of sulfur and other impurities, in this stage, occurs at the molten metal surface. Increasing the area of this surface will cause the reaction to proceed faster.

The time required for the silver containing material in the furnace to be freed of the zinc and for most of the sulfur and other impurities therein to be oxidized will vary depending upon the temperature in the furnace, the configuration of the boat, and the circulation space around the boat, the amount of silver containing material in the boat, and the concentration of impurities therein and the availability of excess oxygen in the furnace enclosure. Generally, with the air and fuel mixture to the furnace adjusted so that there is about 15% molar excess of air over that required to completely burn the fuel and with a charge (on a bone-dry basis) of 80% silver, 5% zinc and 5% sulfur sufficient to produce about 2500 troy ounces of pure silver, the time required in a furnace enclosure of the geometry shown in FIG. 1 to complete the preferred initial purification stage is on the order of several hours.

The completion of the preferred initial purification stage occurs when the vaporizable metal has been completely vaporized and the sulfur content of the silver has been reduced to about 0.5% at which point the remaining sulfur is present as dissolved silver sulfide. This point is easily recognizable by the fact that prior to this point, if oxygen is bubbled into the molten material, as is done in the next and final purification stage, no rapid reaction between oxygen and sulfur will be evident. Also prior to this point a dark film can be seen on the surface of the melt which inhibits the "boiling" reaction. Eventually, however, as the purity of the silver approaches 99.5%, oxygen bubbled through the melt will tend to dissolve therein and react with dissolved silver sulfide to produce sulfur dioxide which escapes from the melt with a violent boiling action at the surface of the melt.

In the final purification stage oxygen is bubbled through the melt until the violent boiling action of escaping sulfur dioxide ceases, indicating that there is essentially no remaining sulfur in the melt, at which point the melt comprises 99.9+% silver. The apparatus, as set up during this final purification stage, is shown in FIG. 2, in which there is also shown oxygen inlet tube 20 through which oxygen is injected into the molten silver below the surface thereof to cause the oxygen to bubble up through the melt. The inlet tube can be of carbon, tantalum, silicon-carbide, alumina or ceramic; however, due to the thermal shock encountered by this tube, the preferred material of construction is quartz. A flat closure member 22 with a vent 24 for the escape of gaseous materials is disposed near the surface of molten silver 18 so as to catch metallic silver ejected from the melt by the boiling action of the escaping sulfur dioxide. Upon completion of the process, the furnace enclosure may be heated again to melt this metallic silver and cause it to fall from the under-side of closure member 22 back into melt 18 or, more preferred, the metal is removed as a solid, porous article. It will be noted that during the final purification stage, additional heat need not be added to furnace enclosure 10 so long as the molten metal in boat 16 does not begin to solidify.

It should be noted that the prepared final purification stage is a process step for producing a porous silver article and/or 99.9+% silver from a melt of about 99.5% silver and 0.5% sulfur, regardless of how this 99.5% molten silver mixture is prepared. Broadly speaking then, with zinc containing feed stocks, the present invention comprises a two-stage process in which the second stage is as described above and the first stage may be any process for producing a melt of the desired composition. Preferably, the first stage is that described above.

This invention is particularly applicable to the purification of the precipitate from zinc-treated spent photographic hypo solutions which generally includes (on a bone-dry basis) about 80% silver, 5% sulfur, and 5% zinc. The process, however, with respect to the preferred embodiment of the first stage, is thought to be useful with any mixture of silver and sulfur or of silver, sulfur and a metal (such as zinc) which tends to vaporize at a temperature in the range 950° to 1200°C. Mercury and cadmium are two such metals.

However, with feedstocks consisting essentially of silver as a major portion and sulfur in minor proportion, only a single purification step is necessary. For example, electrolytic (flake) silver containing about 95% silver, 5% sulfur, needs only a single oxidative, purification step.

If the flake or electrolytic silver is to be refined, the first stage is not necessary. The flake is added to the boat until it is about 75% filled with molten metal. During the melting, plenty of air should be allowed to circulate over the unmelted material. This oxidizes a lot of the sulfur at a lower temperature. On completion of melting the flat member can be placed on the boat and oxygen injection begun.

Preferably the fuel used in the preferred initial purification stage of the present invention is propane or natural gas and the excess oxygen atmosphere is provided by introducing into the furnace a mixture of air with the gas in such proportions that there is roughly a 15% molar excess of air over that necessary to burn completely the fuel gas. However, other hydrocarbon fuels, such as kerosene or fuel oil can be used.

Although relatively pure oxygen (i.e., 95 to 100%) is the preferred oxygen source for injection in the present process, other less pure forms can be used (e.g., air, oxygen-enriched air, or other sources of oxygen in relatively inert gas). In general, the more pure the oxygen source, the more rapid the process rate to purification.

Porous silver articles or silver powder can also be made when the oxygen source is air; however, for a given reaction vessel, gas feed rate, etc., the yield of such articles or powder will be much less (e.g., 50 to 90% less) than when relatively pure (e.g., 85 to 100%) oxygen is used. An especially useful reactor vessel for the process of the present invention is a cupelling furnace, since such a furnace exposes a relatively large surface area for the reacting oxygen. Such a large surface area is desirable in our process.

The present invention is to be distinguished from that of German Pat. No. 947,741 (ausgegeben, Aug. 23, 1956) of Hans J. Nowacki, Wilhelm Teworte, and Peter Vossel, in that this German patent does not appreciate the value of maintaining a gaseous atmosphere directly above the molten silver (i.e., a gas-liquid interface). In the German patent, a liquid flux is maintained above the molten silver (i.e., the interface is mainly a liquid-liquid interface except in those areas of the interface which are disturbed by gas bubbles from escaping $SO_2$ etc.). It is an important feature of the present invention that the separated gaseous impurities (e.g., zinc) and gaseous decomposition products (e.g., $SO_2$) be permitted to escape in vapor phase from the reaction vessel.

If a gas-liquid interface is not maintained, the end-point described herein (i.e., cessation of violent boiling) cannot be observed and production of high purity silver is made more difficult. Furthermore, the presence of a liquid "cover" (e.g., the flux) will prevent (or greatly hinder) the purification obtained by oxidation at the molten metal surface. As I teach herein, it is preferred in the present process that the free area (i.e., gas-liquid interface) of this surface be maximized in order to speed the purification process and to insure a high purity silver product.

Another advantage of the present process over that of the German patent, is that silver articles (e.g., powder, sponge, etc.) can be manufactured, as by collection on a cover member (e.g., the vented cover 12 in FIG. 1).

As has been previously noted, in the present process oxygen can be injected (or passed) through and/or over the melt of impure (e.g., 99.5%) silver. In many instances the purification (to 99.9+% silver) can be effected by passing oxygen only over the surface of said melt, since the oxygen passing over the surface will, in part, dissolve in the melt at the silver-air interface. However, it should be emphasized that it is essential to conduct the final purification step of the process of the present invention in the absence of a flux (or other reagent which would decrease the effective surface area).

One advantage of passing the oxygen over the surface of the melt (without using a dip tube in the melt) is that corrosion of the injection device (e.g., the dip tube) is greatly reduced. Some injection can be effected without actually dipping the injection tube into the melt by maintaining the injection tube close to the surface of the melt (e.g., one inch) and using sufficient gas pressure to insure some bubbling into the melt.

It is further obvious from the foregoing that an important element of the present invention is the maintenance of a silver-oxygen interface in or on the melt of impure silver until the purity is at least 99.9%. This requires the absence of a flux or other similar material at the final processing stage. Where the impure silver contains a flux-forming impurity (e.g., a compound of an alkali metal, as sodium), a flux will form at the surface of said melt and this flux must be removed prior to the final finishing stage in order to provide the required silver-oxygen interface. For example, the impure silver obtained by digestion of developed photographic film to obtain a black-sludgy precipitate can contain (on a bone-dry basis) in the order of 70 to 85% silver (typically 80 to 82%), the remainder being mainly organic matter (e.g., gelatin), sodium compounds and sulfur and/or sulfur compounds. This silver can be purified by passing oxygen into and/or over a melt of this impure silver and maintaining an oxygen-silver interface by removing the sodium-containing slag which forms on the surface of the melt during said purification and especially conducting the final purification in the absence of slag or other similar material on the surface.

With sludge produced by the enzyme processes for digestion of gelatinous film, it is frequently advantageous to add soda ash; however, the resulting slag must be removed prior to final purification.

Zinc oxide can be present as a glass slag at the surface of the melt during purification of zinc-precipitated photographic-hypo sludge. This glass can be removed by collection on a carbon dip rod after it passes from a chunky appearance to a honey-like consistency. About one volume of soda ash to one volume of sludge can be used in the initial purification to aid in zinc (and sulfur) removal, by forming a slag, which can be removed by cooling the melt and separating a solid top slag layer from solid silver metal.

Regarding the silver sponge and silver powder which can be made by the present process it is evident, when the process described herein is run, that the silver powder can be made the predominant product by controlling the distance between the cover and the surface of the melt. That is, a greater distance favors powder formation since there is a greater temperature gradient (therefore, more opportunity for powder to condense) between the melt surface and the collecting or condensing surface. A cross-current of cool air, $CO_2$, nitrogen, etc., can be used to cause cooling and thus favor production of the powder. In contrast, sponge production is favored when the distance from melt surface to the collecting or condensing surface is such that there is little opportunity for powder to cool and condense prior to reaching the collecting surface (or cover member). Note that a flux, slag, or similar material at the surface of the melt during the final purification will prevent production of the desirable silver articles described herein.

The porous silver articles (e.g., sponge) made by the present process are very reactive with sulfur compounds, such as those found as impurities in petroleum fractions (such as gasoline, kerosene, gas oil, lube oils, etc.) or in flue gas from combustion of sulfur containing fuels (e.g., coal). The porous silver and porous silver containing combined sulfur can be used as a reagent to remove the sulfur impurities from such products. For example, a gas oil fraction (or a flue gas) containing about 1% sulfur can be contacted (as at 60° to 400°F) by percolation through a bed of the porous silver for as long as is required to remove the desired amount of sulfur from the gas oil. When the capacity of the bed for removing sulfur is exhausted, the bed can be regenerated as by passig oxygen (or hydrogen) through the bed for sufficient time to remove sulfur and regenerate the porous article. This process is especially useful with flue gas since it does not produce a detrimental, large temperature drop, as do some washing processes.

The porous silver articles, either in pure form or, preferably, containing chemically combined sulfur, can be used as a hydrodesulfurization (or hydrotreating) catalyst. That is, a petroleum stream (such as a kerosene or a paraffinic lube oil containing a sulfur impurity) can be contacted with a bed of the porous silver (e.g., at 250° to 675°F) in the presence of hydrogen (e.g., 50 to 5000 psi hydrogen pressure of 50 to 100% pure hydrogen) for sufficient time to cause the desired reduction in sulfur content.

When the porous silver article is at least about 99.9% pure (as can be obtained by treating a sulfur containing article with oxygen or hydrogen) it can be used as an oxidation catalyst (as for producing formaldehyde from methanol or for making ethylene oxide).

For sulfur removal from flue gas, the process apparatus and conditions can be similar to those in the "Shell Flue Gas Desulfurization" or "SFGD" process, which uses a bed of CuO on alumina as an acceptor for $SO_2$; however, in my process the acceptor material is the porous silver article discribed herein (which can be used in the form of parallel pipeds, such as about one by two by four inches or can be in the form of baffles of any convenient configuration).

The SFGD process is described in "SFGD — A Refiner's Solution to $SO_2$ Emission Restrictions" by R. E. Conser and R. F. Anderson, a paper presented at the "UOP 1973 Technology Conference", a copy of which accompanies the subject application and is incorporated herein by reference.

The invention claimed is:

1. A process for removing sulfur impurities from a fluid comprising flue gas or hydrocarbonaceous substances, said process comprising contacting said fluid with a porous silver article under conversion conditions which cause said sulfur impurity to be removed by said article from said fluid, said porous silver article having a microstructure consisting essentially of a network of inter-connecting cages composed of agglomerates of substantially spherical globules, wherein a substantial number of said spherical globules are visible in said network and wherein said agglomerates are of about uniform size.

2. The process of claim 1 wherein the maximum dimension of the majority of said agglomerates is in the range of three to ten times the average of the mean diameter of said globules.

3. The process of claim 1 wherein said fluid is a petroleum fraction and said conversion conditions include a temperature in the range of 250° to 675°F and a partial pressure of hydrogen in the range of 50 to 500 psi.

4. Process of claim 1 wherein said fluid is a petroleum fraction.

5. Process of claim 4 wherein said fluid is selected from gasoline, kerosene, gas oil and lube oils.

6. A process according to claim 1 wherein said silver article is obtained by a process comprising (1) producing a melt of silver having a purity of less than 99.9% by weight and containing sulfur or chemically combined sulfur as an impurity and (2) injecting and/or passing oxygen of 15 to 100% purity through and/or over said melt, thereby causing violent boiling action at the surface of said melt due to escaping sulfur dioxide, whereby metallic silver is ejected from said melt and caused to collect in porous solid form on a condensing surface and (3) recovering said porous solid silver article from said condensing surface.

7. A process, according to claim 6, wherein said condensing surface comprises a cover member with an opening therein which is disposed above the surface of said melt while oxygen is injected therein so that gaseous materials emanating from said melt may escape but metallic silver material ejected from said melt by said violent boiling action is caught by said cover member.

8. A process, as in claim 6, wherein said melt containing silver and a sulfurous impurity is produced by heating to a temperature of 950° to 1200°C, in excess oxygen atmosphere a product of electrolysis of spent hypo solution or a mixture comprised of silver, sulfur and zinc and continuing said heating process until the sulfur content has been reduced to at least about 0.5%.

9. The process of claim 6 wherein a cross-current of an inert gas or air, at a temperature below the melting point of silver, is caused to divert some of said ejected metallic silver and cause it to solidify in substantially spherical form and wherein solid silver in substantially spherical form is recovered from said cross-current.

10. The process of claim 6 wherein said porous silver article is of a purity less than 99.9% and contains chemically combined sulfur.

* * * * *